United States Patent [19]

Hashimoto et al.

[11] Patent Number: 4,614,693
[45] Date of Patent: Sep. 30, 1986

[54] METAL-HALOGEN SECONDARY BATTERY

[75] Inventors: Takafumi Hashimoto; Yasuo Ando; Kenichiro Jinnai, all of Tokyo, Japan

[73] Assignee: Kabushiki Kaisha Meidensha, Tokyo, Japan

[21] Appl. No.: 739,224

[22] Filed: May 30, 1985

[30] Foreign Application Priority Data

Jun. 6, 1984 [JP] Japan ............................. 59-114396
Jun. 12, 1984 [JP] Japan ............................. 59-119036

[51] Int. Cl.⁴ .................................... H01M 12/00
[52] U.S. Cl. .................................. 429/72; 429/105; 429/199
[58] Field of Search ............... 429/15, 17, 19, 101, 429/105, 199, 50, 51, 72, 14

[56] References Cited

U.S. PATENT DOCUMENTS

| | | | |
|---|---|---|---|
| 3,881,956 | 5/1975 | Williams | 429/12 |
| 3,920,474 | 11/1975 | Zito, Jr. et al. | 429/15 |
| 4,053,684 | 10/1977 | Zito, Jr. et al. | 429/15 |
| 4,105,829 | 8/1978 | Venero | 429/101 |
| 4,491,625 | 1/1985 | Kantner | 429/105 X |
| 4,510,218 | 4/1985 | Ando et al. | 429/101 X |

Primary Examiner—Anthony Skapars
Attorney, Agent, or Firm—Fleit, Jacobson, Cohn & Price

[57] ABSTRACT

A metal-halogen secondary battery has a high state of charging and a capability of storing a large electric power at a high density. In the secondary battery the electrolyte pressure in the positive electrode chamber is higher than the electrolyte pressure in the negative electrode chambers. The metal ions in the positive electrode chambers are permeated into the negative electrode chambers and reduced, and the halogen ions in the negative electrode chambers are also permeated into the positive electrode chambers and oxidized thereby contributing to the storage of the electric power.

11 Claims, 5 Drawing Figures

METAL-HALOGEN SECONDARY BATTERY

BACKGROUND OF THE INVENTION

The present invention relates to an electrolyte circulation-type metal-halogen secondary battery which can be used for example for the purpose of load leveling by storing nighttime surplus electric power and discharging stored electric power at daytime or as a power source for vehicles.

Generally, this type of known secondary battery comprises a battery body containing a positive and negative electrolytes a circulating system for circulating the electrolyte of the battery body and electrolyte storage tanks included in the circulating system.

The battery body comprises a stack of a plurality of unit secondary cells each constituting the minimum unit of the secondary battery. The unit secondary cell includes positive electrode and a negative electrode opposed at a predetermined distance apart and a separator arranged between the positive and negative electrodes so as to define positive electrode chamber between it and the positive electrode and a negative electrode chamber between it and the negative electrode. The positive electrolyte is contained in the positive electrode chamber and the negative electrolyte is contained in the negative electrode chamber.

The circulating system includes a positive electrolyte circulating system for circulating the positive electrolyte and a negative electrolyte circulating system for circulating the negative electrolyte. The positive electrolyte circulating system includes a positive electrolyte circulating pipe means arranged such that the positive electrolyte flowed out from the positive electrode chamber of each of the unit secondary cells is gathered and again returned to the positive electrode chambers and a positive electrolyte circulating pump included in the positive electrolyte circulating pipe means, and the negative electrolyte circulating system includes, similarly as the positive electrolyte circulating system, a negative electrolyte circulating pipe means arranged such that the negative electrolyte flowed out from the negative electrode chamber of each of the unit secondary cells is gathered and again returned to the negative electrode chambers and a negative electrolyte circulating pump included in the negative electrolyte circulating pipe means.

The tanks include a positive electrolyte tank for storing the positive electrolyte and a negative electrolyte tank for storing the negative electrolyte and the positive electrolyte tank is included in the positive electrolyte circulating pipe means. Also, the negative electrolyte tank is included in the negative electrolyte circulating pipe means.

The electrolyte consists of a solution of a metal-halogen compound and added to this solution is a complexing agent for converting halogen molecules to a complex compound. In addition to these, upon charge the positive electrolyte produces and contains halogen molecules and a complex compound of halogen molecules. The separator is made of an ion-permeable porous membrane which prevents the permeation of halogen molecules from the positive electrode chamber to the negative electrode chamber.

In this secondary battery, the positive electrolyte is circulated through the positive electrolyte circulating system by the positive electrolyte circulating pump and the negative electrolyte is circulated through the negative electrolyte circulating system by the negative electrolyte circulating pump. During the charging and discharging, the following oxidation-decrease reactions take place.

In other words, during the charging the metal ions in the negative electrode chamber are attracted to the negative electrode so that the metal ions are provided with electrons and reduced on the surface of the negative electrode thus depositing themselves as a metal on the surface of the negative electrode. On the other hand, the metal ions in the positive electrode chamber permeate through the separator and enter into the negative electrode chamber thereby similarly depositing themselves as a metal. In this case, the halogen ions in the positive electrode chamber are attracted to the positive electrode so that the halogen ions lose their electrons and are oxidized on the surface of the positive electrode thereby depositing themselves as halogen atoms on the surface of the anode. A halogen molecule is formed by the bonding of two halogen atoms and the resulting halogen molecules are dissolved in the positive electrolyte. Also, the halogen ions in the negative electrode chamber permeate through the separator and enter into the positive electrode chamber where similarly they are formed into halogen molecules and dissolved in the positive electrolyte. A considerable part of these halogen molecules dissolved in the positive electrolyte is converted to a halogen complex compound by the complexing agent in the electrolyte and it is then removed from the reaction system. Since the separator is made of a porous membrane which prevents the permeation of halogen molecules and the halogen complex compounds, the halogen molecules and the complex compounds remaining in the positive electrolyte are prevented from diffusing into the negative electrolyte and they are retained in the positive electrolyte.

During the discharge, the metal deposited on the surface of the negative electrode is now gradually oxidized from the surface so that it is converted to metal ions and enter into the negative electrolyte while leaving the electrons on the negative electrode.

A part of the metal ions entering into the negative electrolyte permeates through the separator and enters into the positive electrolyte of the positive electrode chamber. In this case, the halogen molecules in the positive electrolyte are provided with electrons from the positive electrode on its surface and are reduced. Thus, they are converted to halogen ions and diffused into the positive electrolyte. The halogen ions diffused into the positive electrolyte permeate through the separator and are diffused into the negative electrolyte of the negative electrode chamber. While the halogen molecules are decreased in the positive electrolyte as a result of their decrease, the complex compound of halogen molecules is decomposed due to a decrease in the concentration of the halogen molecules in the positive electrolyte and consequently the concentration of the halogen molecules in the positive electrolyte is maintained constant.

Then, it is desirable that the secondary battery used for such purposes as the storage of nighttime surplus electric power or a power source for vehicles is high in energy density or the ratio of the charged electric energy to its volume and weight in order to ensure efficient utilization of the available space for installation and efficient utilization of the stored energy. However, since the conventional secondary battery is constructed as described hereinabove, it is considerably large in volume and weight and low in energy density and therefore its use in such applications as the storage of nighttime surplus electric power or a power source for vehicles gives rise to such disadvantages that it is difficult to attain efficient utilization of the space available for installation and that it is also difficult to realize efficient utilization of the stored energy.

SUMMARY OF THE INVENTION

It is the primary object of the present invention to provide a secondary battery so designed that the state of charging is increased as far as possible, that the energy density is increased as far as possible, that the space available for installation is utilized as efficiently as possible and that the stored energy is utilized as efficiently as possible. The secondary battery comprises a stack of unit secondary cells each thereof including a positive and a negative electrodes which are arranged opposite to each other at a predetermined distance apart and a separator arranged between the positive and the negative electrodes so as the define a positive electrode chamber between it and the positive electrode and a negative electrode chamber between it and the negative electrode and an electrolyte contained in each of the positive electrode chamber and the negative electrode chamber, and at least one circulating pump for circulating the electrolyte. Each separator is made of a porous membrane which prevents the permeation of halogen molecules and the halogen complex compounds. The electrolyte consists of a solution of a metal-halogen compound and the electrolyte pressure in the positive electrode chambers is higher than that of the negative electrode chambers. In accordance with the invention, the metal ions in the positive electrode chambers permeate, along with the electrolyte, through the separators and enter into the negative electrode chambers, with the result that during the charging these metal ions are also reduced and the metal ions contained in the electrolyte as a whole are effectively utilized for the charging thereby accomplishing the above-mentioned object.

DESCRIPTION OF THE PREFERRED EMBODIMENT

Figure 1:
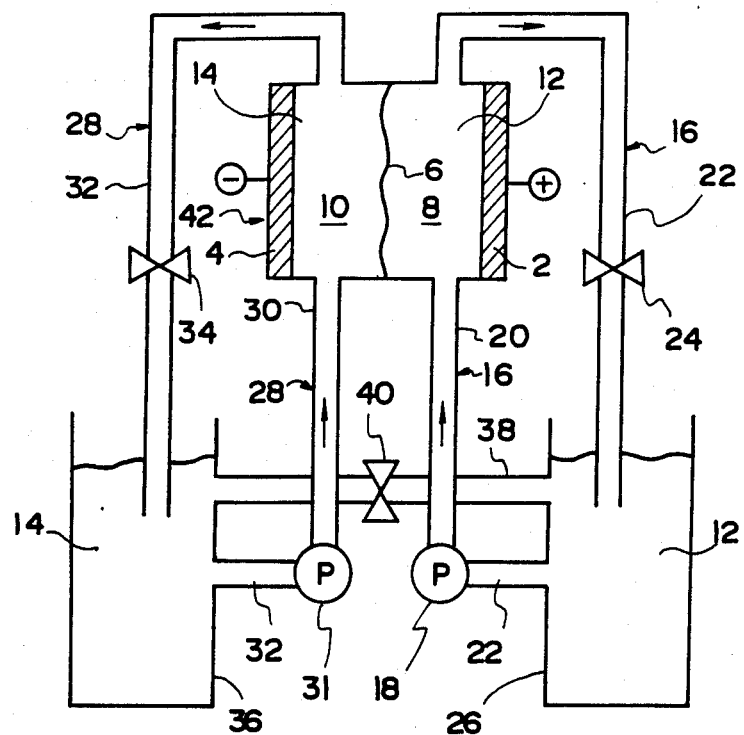
FIG. 1 is a schematic diagram showing a first embodiment of the invention.

FIG. 1 illustrates a first embodiment of the present invention. In the Figure, a positive electrode 2 and a negative electrode 4 are arranged opposite to each other at a predetermined distance apart. Each of the positive electrode 2 and the negative electrode 4 is made of a condutive carbon black plastic sheet (polyethylene 60 to 80% by weight, carbon black 20 to 40% by weight) having a resistance to bromine.

Arranged between the positive electrode 2 and the negative electrode 4 is a separator 6 which defines a positive electrode chamber 8 between the separator 6 and the positive electrode 2 and a negative electrode chamber 10 between separator 6 and the negative electrode 4. The separator 6 is made of an ion-permeable porous membrane which prevents the permeation of bromine molecules and the bromine complex compounds.

An electrolyte is contained in each of the positive electrode chamber 8 and the negative electrode chamber 10 and the electrolyte contained in the positive electrode chamber 8 is converted to a positive electrolyte 12 and the electrolyte contained in the negative electrode chamber 10 is converted to a negative electrolyte 14. Zinc bromide is dissolved in the electrolyte and also a complexing agent for converting bromine molecules to a complex compound is added to the electrolyte. Thus, upon charging bromine molecules and a complex compound of bromine molecules are formed in the positive electrolyte 12.

Connected to the positive electrode chamber 8 is a positive electrolyte circulating pipe means 16 for flowing out the positive electrolyte 12 contained in the positive electrode chamber 8 and supplying the flowed out positive electrolyte 12 back into the positive electrode chamber 8. A pump 18 is included in the positive electrolyte circulating pipe means 16 so as to circulate the positive electrolyte 12 in the direction of arrows.

The positive electrolyte circulating pipe means 16 comprises a positive electrolyte supply pipe 20 extending from the positive electrolyte circulating pump 18 to the inlet of the positive electrode chamber 8 and a positive electrolyte return pipe 22 extending through a positive electrolyte storage tank 26 from the outlet of the positive electrode chamber 8 to the positive electrolyte circulating pump 18. The positive electrolyte return pipe 22 includes a positive valve 24 and the positive electrolyte storage tank 26 is arranged between the positive valve 24 and the positive electrolyte circulating pump 18.

Connected to the negative electrode chamber 10 is a negative electrolyte circulating pipe means 28 for flowing out the negative electrolyte 14 contained in the negative electrode chamber 10 and supplying the flowed out electrolyte back to the negative electrode chamber 10. The negative electrolyte circulating pipe means 28 includes a negative electrolyte circulating pump 31 for circulating the negative electrolyte 14 in the directions of arrows.

The negative electrolyte circulating pipe means 28 comprises a negative electrolyte supply pipe 30 extending from the negative electrolyte circulating pump 31 to the inlet of the negative electrode chamber 10 and a negative electrolyte return pipe 32 extending through a negative electrolyte storage tank 36 from the outlet of the negative electrode chamber 10 to the negative electrolyte circulating pump 31. The negative electrolyte return pipe 32 includes a negative valve 34 and also the negative electrolyte storage tank 36 is arranged between the negative valve 34 and the negative electrolyte circulating pump 31.

The positive electrolyte storage tank 26 and the negative electrolyte storage tank 36 are connected through a communication pipe 38 and a communication pipe valve 40 is included in the communication pipe 38.

In the secondary battery constructed as described above, during the charging the amounts of circulating electrolytes are adjusted by the circulating pumps 18 and 31 or by the valves 24 and 34 and the electrolyte pressure in the positive electrode chamber 8 is increased over that in the negative electrode chamber 10. When this occurs, the zinc ions in the positive electrolyte 12 of the positive electrode chamber 8 are caused, along with the electrolyte, to permeate through the separator 6 and flow into the negative electrode chamber 10 so that the zinc ions are reduced on the surface of the negative electrode 4 and deposited as metal zinc. When the negative electrolyte 14 in the negative electrolyte storage tank 36 increases in a volume by permeating through the separator 6, increased negative electrolyte is returned to the positive electrolyte storage tank 26 through the communication pipe 38 and the communication pipe valve 40. In the case of the conventional secondary battery, during the charging only zinc ions in the negative electrolyte 14 are reduced in the main and therefore the construction of the secondary battery according to the above-described embodiment has the effect of ensuring effective utilization of the metal ions in the electrolyte thus increasing the state of charging and the energy density of the battery.

An example of the above-described embodiment and a comparative example will now be described.

EXAMPLE 1

Using the positive electrode 2 and the negative electrode 4 each having an area of 1600 cm$^2$, the positive electrolyte tank 26 and the negative electrolyte tank 36 each having a volume capacity of 900 ml and containing 796 ml of the electrolyte, the electrolyte composition of 3 mol/l ZnBr$_2$ and 1 mol/l Q-Br$_2$ (Q=complexing agent) and the positive electrolyte circulating pump 18 and the negative electrolyte circulating pump 31 having the same power output, fully opening the positive valve 24 and half-opening the negative valve 34, while forcing the electrolyte to flow into the negative electrode chamber 10 from the positive electrode chamber 8 through the separator 6, the battery was charged for 6.4 hours with a current of 32 A and then the battery was discharged with the same current value until the cell voltage was decreased to 0.5 V, with the result that there was no occurrence of hydrogen gassing up to the expiration of 6.4 hours and that the voltage efficiency of 86%, the coulomb efficiency (current efficiency) of 83% and the energy efficieny (voltage efficiency X coulomb efficiency) of 71.4% were obtained. The ampere-hour of Zn in 796 ml of negative electrolyte (3 mol/l ZnBr$_2$+1 mol/l Q-Br$_2$) is theoretically given as follows:

$$0.796 l \times 3\ mol/l \times 2 \times 9.648 \times 10^4\ c/mol/3600 = 128\ Ah$$

In this example, the charged ampere-hour becomes $32 A \times 6.4\ h = 204.8 Ah$. Thus, in this case, the state of charging becomes as follows:

$$204.8\ Ah \times 100/128\ Ah \times 2 = 79.7\ (\%)$$

COMPARATIVE EXAMPLE 1

Figure 2:
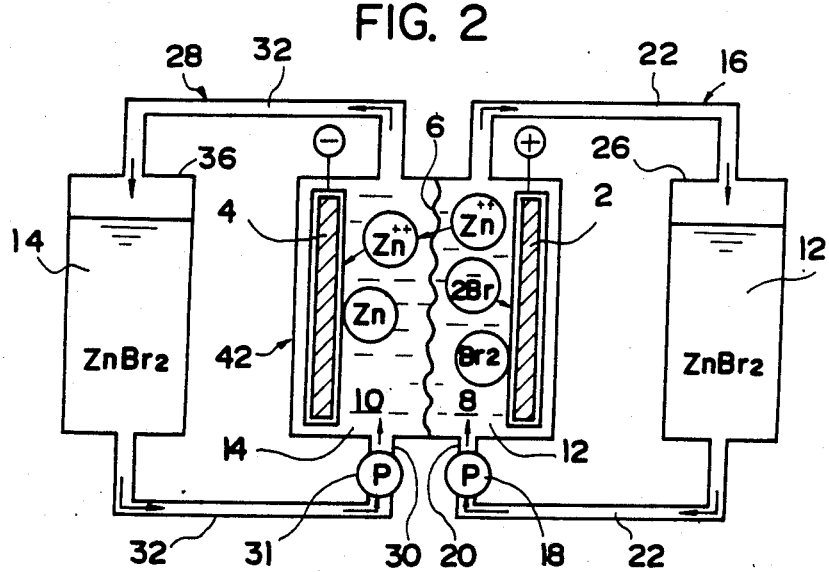
FIG. 2 is a schematic diagram showing a conventional secondary battery of the above type.

Using the conventional zinc-bromine secondary battery shown in FIG. 2, the battery was subjected to a charge and discharged test under the same conditions as the Example 1 with the result that there was the occurrence of hydrogen gassing at the expiration of 5 hours after starting the charge and that the voltage efficiency of 65%, the coulomb efficiency of 43% and the energy efficiency of 28% were obtained.

Since the ampere-hour of Zn in the negative electrolyte was 128 Ah as mentioned previously, the charging with 32 A ought to have caused the occurrence of hydrogen gassing after the expiration of 4 hours (128 Ah÷32 A=4 h). In fact, however, there was the occurrence of hydrogen gassing at the expiration of 5 hours after starting the charge. This appeared to have been caused by the diffusion of the Zn ions through the separator from the positive electrolyte into the negative electrolyte. In this case, the state of charging is given as follows:

$$32\ A \times 5\ h \times 100/128\ Ah \times 2 = 62.5\ (\%)$$

Figure 3:
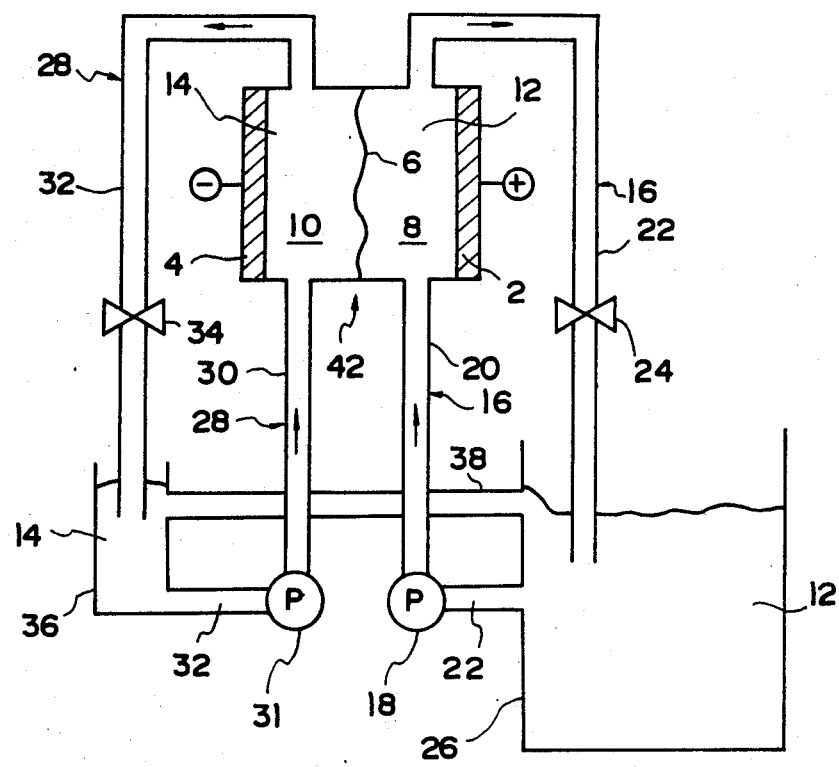
FIG. 3 is a schematic diagram showing a second embodiment of the invention.

FIG. 3 illustrates a second embodiment of the invention. This embodiment is identical with the first embodiment except that the positive electrolyte storage tank 26 is greater in volume than the negative electrolyte storage tank 36 and that the positive electrolyte 12 is greater in quantity than the negative electrolyte 14.

In the secondary battery of the first embodiment, during the charging a considerable amount of the bromine molecules formed on the positive electrode 2 is converted to a complex compound (e.g., Br$_3$-Q or Br$_5$-Q) by the complexing agent in the electrolyte, precipitated in the positive electrode chamber (8) and removed from the reaction system. The residual bromine molecules remain as such in the positive electrolyte 12. A part of the bromine molecules thus existing as such in the positive electrolyte 12 permeates through the separator 6, diffuses into the negative electrolyte 14 and reacts with the deposited metal zinc on the negative electrode 4 or causes a self-discharge thereby deteriorating the coulomb efficiency.

In accordance with the second embodiment, the positive electrolyte 12 is greater in quantity than the negative electrolyte 14 with the result that the concentration of the bromine molecules present in the positive electrolyte 12 is decreased and the amount of the bromine molecules diffused into the negative electrolyte 14 is decreased thus decreasing the self-discharge out and thereby increasing the coulomb efficiency.

On the other hand, an increase in the concentration of the complex compound in the positive electrolyte 12 decreases the electric conductance of the positive electrolyte 12. In accordance with the second embodiment, the amount of the positive electrolyte 12 is greater than in the first embodiment and the concentration of the complex compound is lower than that of the first embodiment so that the electric conductance of the positive electrolyte 12 is increased and the coulomb efficiency is increased.

An example of the second embodiment will now be described.

EXAMPLE 2

The battery was tested under the same conditions as in Example 1 except that the positive electrolyte tank 26 had a volume capacity of 1600 ml, the negative electrolyte tank 36 had a volume capacity of 200 ml, the amount of the positive electrolyte was 1442 ml and the amount of the negative electrolyte 14 was 150 ml. As in the case of Example 1, the results showed that there was no occurrence of hydrogen gassing up to the expiration of 6.4 hours and that the voltage efficiency of 88%, the coulomb efficiency of 84% and the energy efficiency of 73.9% were obtained. Thus, the energy efficiency was improved by 2.5% over that of Example 1.

Figure 4:
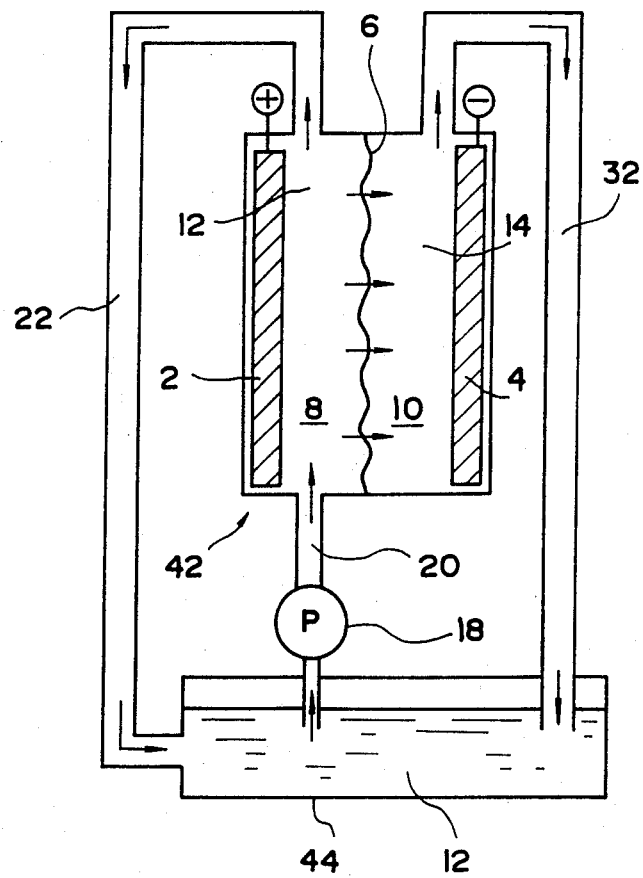
FIG. 4 is a schematic diagram showing a third embodiment of the invention.

FIG. 4 illustrates a third embodiment of the invention. In the Figure, the construction of a battery body 42 is the same as in the first embodiment. Numeral 44 designates an electrolyte tank and it stores an electrolyte 12 having zinc bromide dissolved therein and containing a complexing agent. The electrolyte tank 44 and positive electrode chamber 8 are connected through a positive electrolyte supply pipe 20. The positive electrolyte supply pipe 20 includes a circulating pump 18 arranged for supplying the electrolyte 12 to the positive electrode chamber 8. Connected to one side of the positive electrode chamber 8 opposite to another side thereof connected to the positive electrolyte supply pipe 20 is one end of a positive electrolyte return pipe 22 for returning the electrolyte in the positive electrode chamber 8 or the positive electrolyte 12 to the electrolyte tank 44 and the other end of the positive electrolyte return pipe 22 is connected to the electrolyte tank 44. Connected to a negative electrode chamber 10 is one end of a negative electrolyte return pipe 32 for returning the electrolyte in the negative electrode chamber 10 or the negative electrolyte 14 to the electrolyte tank 44 and the other end of the negative electrolyte return pipe 32 is connected to the electrolyte tank 44.

In the secondary battery of the third embodiment constructed as described above, when the circulating pump 18 is operated, the electrolyte 12 is circulated through the positive electrolyte supply pipe 20, the positive electrode chamber 8 and the positive electrolyte return pipe 22 and at the same time the electrolyte pressure in the positive electrode chamber 8 is increased so that the positive electrolyte 12 excluding the bromine molecules and bromine complex compounds permeates into the negative electrode chamber 10 and it is returned to the electrolyte tank 44 through the negative electrolyte return pipe 32. The oxidation-decrease reactions during the charging and discharging are the same as in the first embodiment and the effects are the same as the first embodiment. While, in the first and second embodiments, the negative electrolyte 14 is circulated by means of the negative electrolyte circulating pump 31 so as to prevent the localized growth of dendrites on the negative electrode 4, in the third embodiment the electrolyte 12 is permeated into the negative electrode chamber 10 from the positive electrode chamber 8 thereby preventing the localized growth of dendrites.

Figure 5:
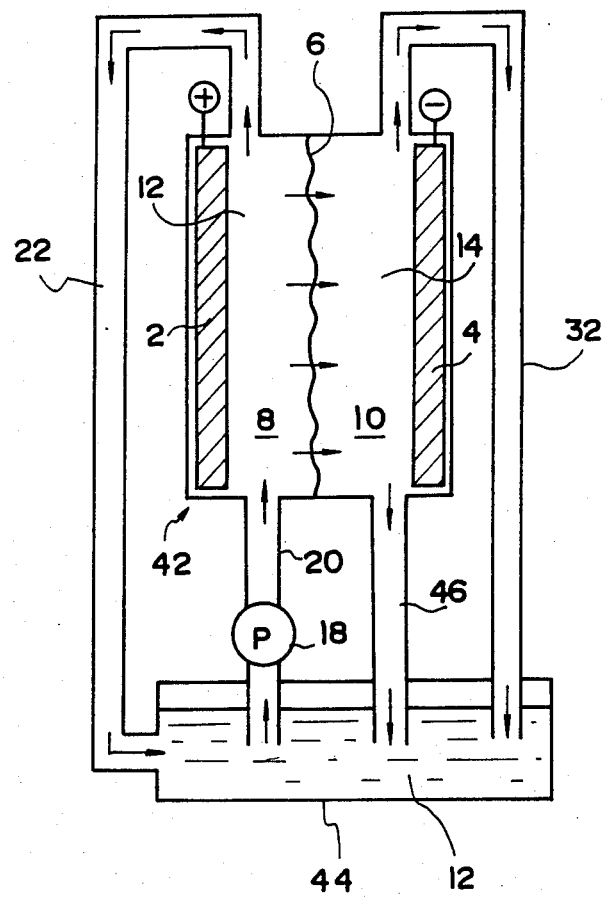
FIG. 5 is a modification of the embodiment shown in FIG. 4.

FIG. 5 illustrates a modification of the embodiment of FIG. 4, in which the negative electrolyte 14 is also flowed out from the lower part of the negative electrode chamber 10 and for this purpose a negative electrolyte return pipe 46 is connected to the electrolyte tank 44. In accordance with this modification during the discharge, the metal zinc ions dissolved into the negative electrolyte from the negative electrode 4 is prevented from accumulating in the lower part of the negative chamber 10 and growing of dendrites during the recharging due to the localized distribution of the metal zinc ion concentration.

From the foregoing it will be seen that due to the use of only the single circulating pump 18 and the single electrolyte tank 44, these embodiments not only ensure a greater overall energy efficiency but also are small in size and weight as compared with other types employing such pump and tank arrangements as used in the first and second embodiments.

The secondary battery weight and installation volume of the first and third embodiments of the invention respectively having the electric power capacity of 1 Kw are shown in the following Table 1.

TABLE 1

|  | Weight (kg) | Volume (m³) |
|---|---|---|
| first embodiment | 398.5 | 1.22 |
| third embodiment | 270.5 | 0.81 |

The weight and installation volume of the third embodiments secondary battery are respectively decreased by 32% and 33% against the first embodiment secondary battery. Also, while, in the battery of this embodiment, the disassembly of the secondary battery upon the completion of the charging and discharging showed that there was no marked localized growth of dendrites. It is to be noted that in this Example a dendrite inhibitor was added to the electrolyte.

What is claimed is:

1. A metal-halogen secondary battery comprising:
    a positive electrode and a negative electrode which are arranged opposite to each other at a predetermined distance apart;
    a separator arranged between said positive electrode and said negative electrode so as to define a positive electrode chamber between said separator and said positive electrode and a negative electrode chamber between said separator and said negative electrode, said separator comprising a porous memberane which prevents the permeation of halogen molecules therethrough;
    negative electrolytes and positive electrolytes which are contained in each of said positive electrode chamber and said negative electrode chamber, said negative electrolytes and positive electrolytes being composed of a solution of a metal-halogen compound;
    circulating means including a pump and at least one electrolyte storage tank for circulating said positive electrolytes and said negative electrolytes from said electrolyte storage tank through said pump to each of said positive electrode chamber and said negative electrode chamber;
    pressure control means for obtaining and maintaining a higher electrolyte pressure in said positive electrode chamber than in said negative electrode chamber to cause said positive electrolytes to flow from said positive electrode chamber through said separator to said negative electrode chamber; and
    communication means to allow said negative electrode chamber to communicate with said positive electrode chamber to cause part of said negative electrolytes to flow from said negative electrode chamber through said communication means and said circulating means to said positive electrode chamber.

2. A secondary battery according to claim 1, wherein said electrolyte storage tank is comprised of a negative electrolyte storage tank and a positive electrolyte storage tank,
    wherein said negative electrode chamber and said positive electrode chamber are each provided with inlet means and outlet means respectively,
    said inlet means of said negative electrode chamber being connected hydraulically by a negative electrolyte circulating pipe to said negative electrolyte storage tank through a negative electrolyte circulating pump,
    said inlet means of said positive electrode chamber being connected hydraulically by a positive electrolyte circulating pipe to said positive electrolyte storage tank through a positive electrolyte circulating pump, said outlet means of said negative electrode chamber being connected hydraulically to said negative electrolyte storage tank through a valve, said outlet means of said positive electrode chamber being connected hydraulically to said positive electrolyte storage tank through a valve, and wherein said negative electrolyte storage tank is connected hydraulically to said positive electrolyte storage tank by said communication means.

3. A secondary battery according to claim 2, wherein said positive electrolyte circulating pump has a delivery power greater than that of said negative electrolyte circulating pump.

4. A secondary battery according to claim 2,
wherein said positive electrolyte circulating pipe includes a valve, said negative electrolyte circulating pipe includes a valve, and wherein said valve of said positive electrolyte circulating pipe has a larger passage than said valve of said negative electrolyte circulating pipe.

5. A secondary battery according to claim 2, wherein the volume of said positive electrolytes in said positive electrolyte storage tank is greater than the volume of said negative electrolytes in said negative electrolyte storage tank.

6. A secondary battery according to claim 1,
wherein said communication means includes a communicating pipe.

7. A secondary battery according to claim 1,
wherein said electrolyte storage tank is formed as a common tank comprising a negative electrolyte storage tank, a positive electrolyte storage tank, and said communication means.

8. A secondary battery according to claim 1,
wherein said negative electrolyte chamber and said positive electrolyte chamber are each provided with inlet means and outlet means, wherein said inlet means of said positive electrode chamber is hydraulically connected to said electrolyte storage tank through said pump, and wherein said outlet means of said positive electrode chamber and said outlet means of said negative electrode chamber are each hydraulically connected to said electrolyte storage tank through a positive electrolyte outlet pipe and a negative electrolyte outlet pipe respectively.

9. A secondary battery according to claim 8,
wherein said negative electrolyte outlet pipe is connected to a lower part of said negative electrode chamber.

10. A secondary battery according to claim 7,
wherein said negative electrolyte chamber and said positive electrolyte chamber are each provided with inlet means and outlet means, wherein said inlet means of said positive electrode chamber is hydraulically connected to said electrolyte storage tank through said pump, and wherein said outlet means of said positive electrode chamber and said outlet means of said negative electrode chamber are each hydraulically connected to said electrolyte storage tank through a positive electrolyte outlet pipe and a negative electrolyte outlet pipe respectively.

11. A secondary battery according to claim 10,
wherein said negative electrolyte outlet pipe is connected to a lower part of said negative electrode chamber.

* * * * *